United States Patent [19]

Schaller

[11] 4,342,021
[45] Jul. 27, 1982

[54] POSITION OR MOVEMENT SENSOR, E.G. FOR CONVEYANCES SUCH AS LIFTS

[75] Inventor: Ronald W. Schaller, London, England

[73] Assignee: Seltrust Engineering Limited, London, England

[21] Appl. No.: 165,828

[22] Filed: Jul. 3, 1980

[30] Foreign Application Priority Data

Jul. 6, 1979 [GB] United Kingdom ................ 7923672

[51] Int. Cl.³ .......................... G08G 1/01; B66B 3/02; G01D 5/00
[52] U.S. Cl. .................................... 340/38 L; 340/24; 340/553
[58] Field of Search ..................... 340/38 L, 552, 553, 340/870.31, 23, 24, 22; 324/58.5 R, 52

[56] References Cited

U.S. PATENT DOCUMENTS

| | | | |
|---|---|---|---|
| 2,580,155 | 12/1951 | Brannen | 340/553 |
| 3,560,970 | 2/1971 | Kamimura et al. | 340/552 |
| 3,668,625 | 6/1972 | Wolf | 340/23 |
| 3,711,203 | 1/1973 | Sato et al. | 340/24 |
| 4,215,341 | 7/1980 | Cole | 340/553 |
| 4,218,671 | 8/1980 | Lewis | 340/23 |

FOREIGN PATENT DOCUMENTS

2610127 9/1977 Fed. Rep. of Germany .

*Primary Examiner*—Thomas A. Robinson
*Attorney, Agent, or Firm*—Blanchard, Flynn, Thiel, Boutell & Tanis

[57] ABSTRACT

A position or movement sensor responsive to movement of a mine cage (26) in a mineshaft comprises a leaky coaxial cable (12) extending along the path of the cage, and an oscillator (40) and associated circuitry (42, 44, 14) for forming an electromagnetic standing wave in the cable. The cage carries a resonator (28) which moves adjacent the cable, causing a cyclical change in the cable characteristics as seen from a detector probe (30) at the top end of the cable. Detection and counting circuitry (32) detects and indicates movement of the cage by reference to the standing wave pattern.

8 Claims, 11 Drawing Figures

POSITION OR MOVEMENT SENSOR, E.G. FOR CONVEYANCES SUCH AS LIFTS

This invention relates to a position or movement sensor. The invention is in particular applicable to systems for monitoring the position or movement of a conveyance such as a lift (or elevator). An example of such an application is with mine cages, which are used for transporting miners and equipment up and down mine shafts.

This is a problem which hitherto has proved difficult to solve.

It is desired to control a mine cage to an accuracy of a few centimeters at a depth of several hundreds of meters. Conventionally, this is done by monitoring the pay-out of the cable by which the mine cage is supported. With this arrangement inaccuracies can be caused by elongation of the cable and by slip of the cable over the wheel used to detect its pay-out.

This invention seeks to enable a reduction in these problems, and is defined in the appended claims, to which reference should now be made.

Leaky radiating cables are known for use in communication systems, particularly for use in railway systems and mines. The idea of using such a cable for communication purposes has been known for many years (see N. Monk and H. S. Winbigler "Communication with moving trains in tunnels" *IRE Trans. Vehic. Comm.*, December 1956, PGVC-7, pages 21 to 28). Such cables are usually coaxial cables and differ from a standard braided type of cable in that the outer conductor is incomplete, having an overall optical cover typically of 60 to 70%. This may be achieved by opening out the braiding, or by forming the outer conductor with slots or holes. The cables have the advantage that attenuation along the cable is very little influenced by contamination and moisture on the cable surface. Such cables can be obtained for example from BICC Wiring and General Cables Division, Helsby, Warrington, Lancashire, England. A brief outline of the theory of such cables is to be found in *Electronics Letters* VOL. 8, No. 18, Sept. 7, 1972, pages 465 to 466, and examples of their use in "Radiocommunications in Confined Spaces" *Pye Telecom Engineering Notes*, publication TSP 394/1. Fuller theoretical details are to be found in the various papers presented at the Colloquium on Leaky Feeder Radio Communication Systems held at the University of Surrey, Guildford Apr. 8–10, 1974.

We have appreciated that leaky radiating cables of this type are particularly suitable for use in a sensor embodying this invention.

The invention will be described in more detail, by way of example, with reference to the drawings, in which.

Figure 1:
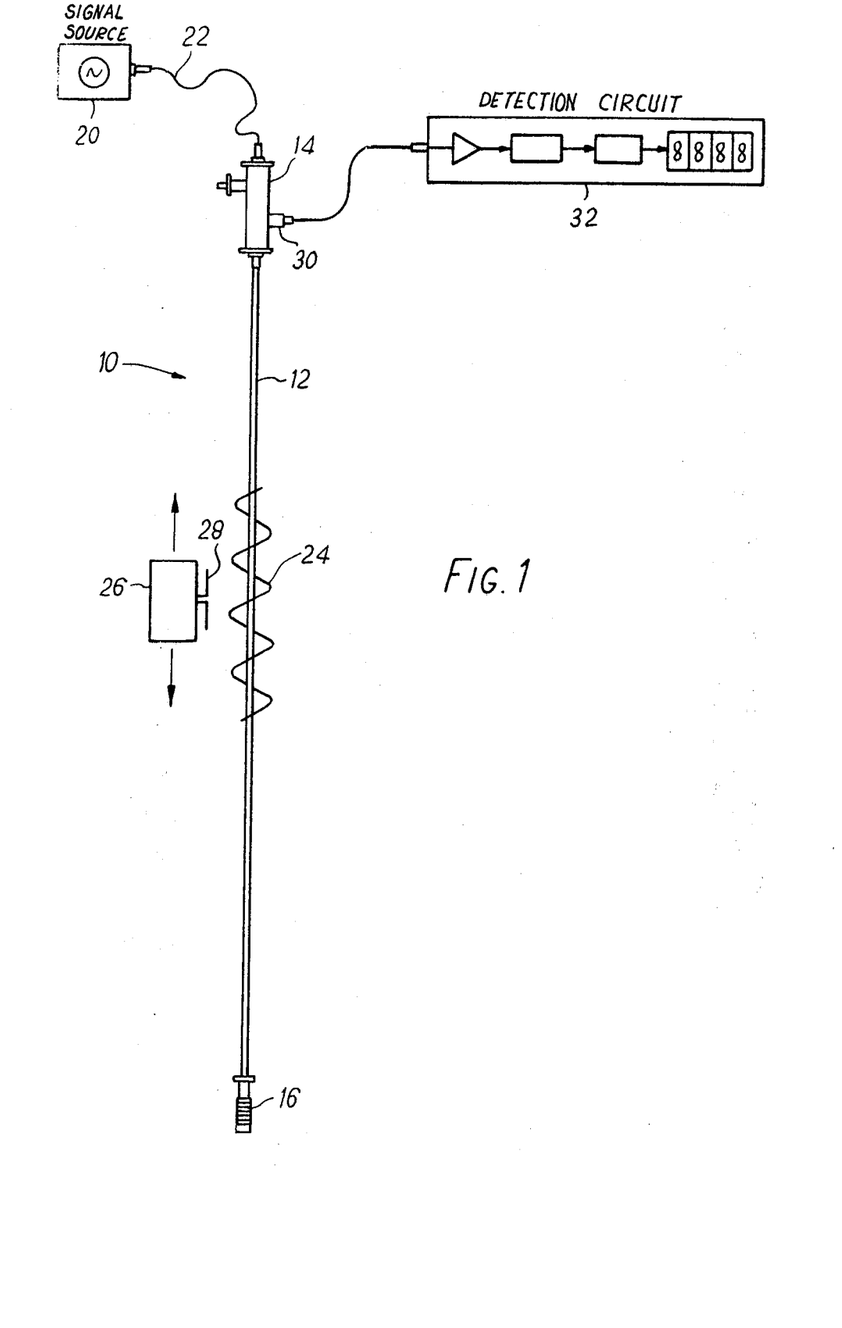
FIG. 1 is a schematic diagram of a position sensor embodying the invention.

Referring to FIG. 1 of the drawings, the sensor 10 includes a leaky radiating cable 12 typically of one inch (25 mm) diameter which extends between a coaxial cavity 14 at one end and a terminating impedance 16 at the other end. An R.F. signal source 20 feeds the cavity 14 via a coaxial feeder 22. The source is initially tuned to set up a standing wave in the cable 12, as indicated diagrammatically at 24. To this end the load impedance 16 is tuned so as to give the most suitable voltage standing wave ratio.

The object 26 to be monitored, e.g. a mine cage, moves parallel to the cable 12 and carries a passive resonator 28 which is likewise tuned to the source frequency. The resonator does not contact the cable 12, but is placed on the object 26 so as to be close to the cable. The resonator 28 can take the form of a dipole aerial; examples of suitable resonators are given below with reference to FIGS. 5 and 6.

With the previously proposed communication systems incorporating leaky cables, standing waves are undesirable and steps are taken to reduce them. This invention is based on the appreciation that such standing waves can in fact provide a particularly elegant way of sensing position or movement. The standing waves define a reference which depends only on the frequency of the source and the propagation velocity of the wave in the cable. If frequencies greater than 10 MHz are used, then the wavelength will be less than 30 meters and nodes will occur down the cable at intervals of not more than 15 meters. These nodes and/or the antinodes can be detected and counted to give a distance measure in terms of the number of wavelengths traversed by the object.

Figure 2:
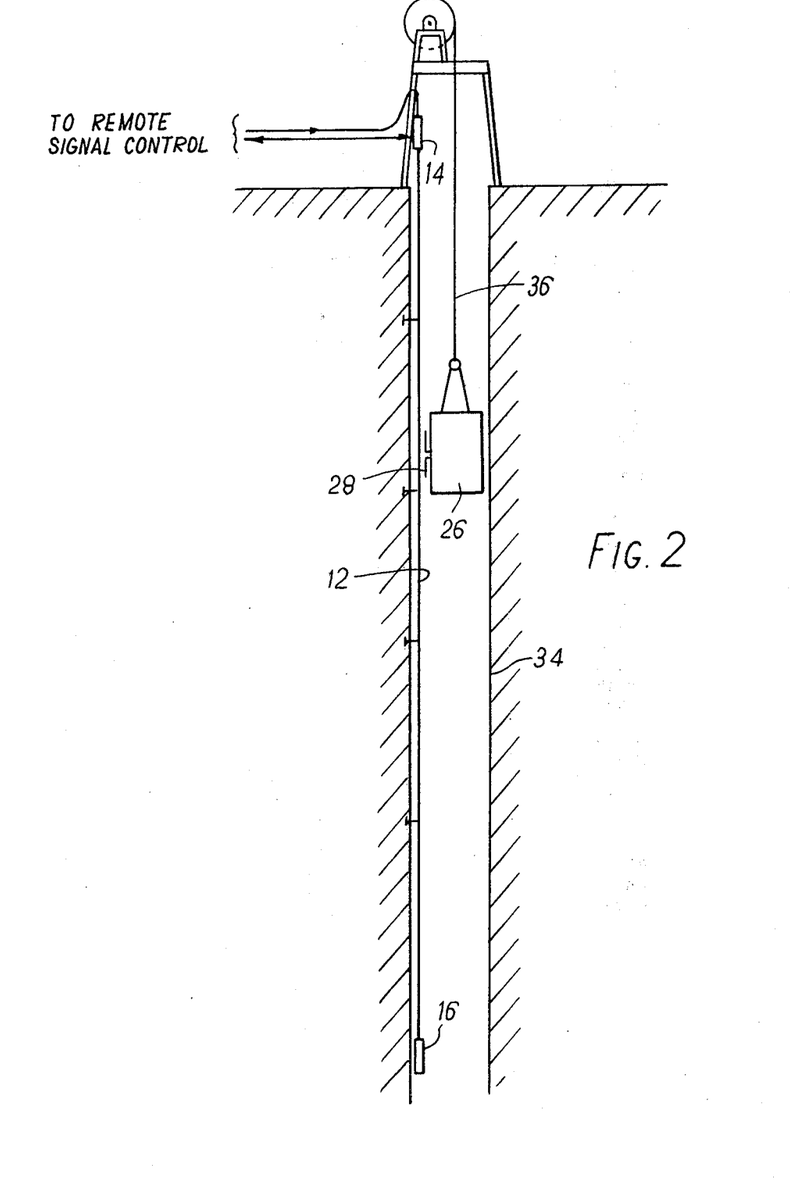
FIG. 2 illustrates the use of the sensor with a mine cage in a mine shaft.

The measurement could be made by detection equipment on the object 26 itself. However, it is preferred to have the measuring equipment at one end of the cable. A detector probe 30 is incorporated in the cavity 14 and is connected to a detection circuitry 32, described below, to monitor the characteristics of the standing wave pattern. The resonator when placed adjacent to the nodes on the leaky transmission line will cause a change in the characteristics of the standing wave. As the resonator moves along the cable, there will be a cyclical change in the characteristics as the object passes each node. Monitoring these characteristics enables the movement of the object to be detected. The characteristic detected may be phase, current or voltage. FIG. 2 illustrates the use of the sensor to monitor movement of a mine cage. The mine cage 26 is in a vertical shaft 34, and the resonator 28 is mounted at any convenient point on the outside of the cage adjacent to the cable 12. The cable 12 runs down the shaft 34 and is attached to the shaft at intervals. The cavity 14 is mounted at the shaft head, and the source and detector are at any convenient remote location. The system does not rely on detecting the winding of the main cable or hawser 36, nor are electrical cables required from the mine cage 26 to the winding control room.

The sensor could be used in other systems where movement detection is required. Such systems would include objects moving in horizontal or sloping tunnels, transporting or haulage systems such as tracked conveyances or underground railway systems whether in a mine or public transport system, and numerous other types of moving machinery or vehicles.

Figure 3:
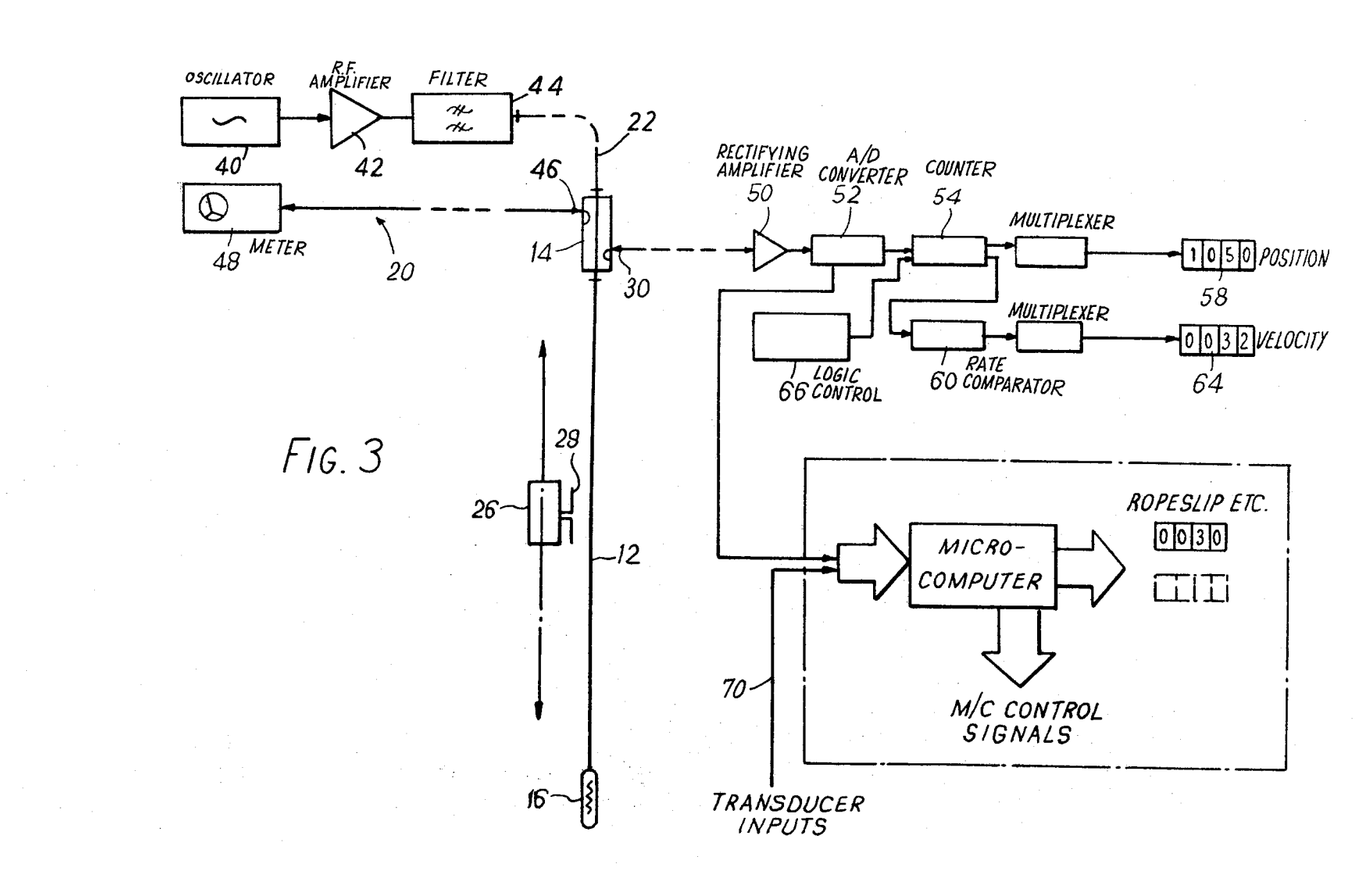
FIG. 3 is a block circuit diagram of the circuitry connected to the leaky cable.

Referring now to FIG. 3, the electrical circuitry will be described. R.F. source 20 includes an oscillator 40 coupled through an R.F. amplifier 42 and a filter 44 to the feeder 22 and hence to the probe cavity 14. The cavity operates as a reflectometer and includes in addition to the detector probe 30, a second probe 46 which monitors the amplitude of the standing wave and applies it to a meter 48. The meter reading is used in the manual adjustment of the oscillator 40 in the setting up of the system.

In this example the cable 12 has a continuous slot axially disposed along the length of the cable, and provides a polar radiating characteristic with a fixed major lobe. The resonator 28 is positioned to be in the direction of this lobe.

The detector circuit 32 is connected to the detector probe 30. This probe 30 forms the datum position with respect to which distances are measured. The probe output is applied to a rectifying amplifer 50, which is in turn connected to an analogue to digital converter 52, and a counter 54. The counter holds a count which represents the number of standing wave nodes which the resonator has passed in moving from a reference position. The count is applied in multiplexed form to a display 58. This is a position display and is scaled to show the number of feet or meters by which the cage 26 has descended.

The signal received by the detector 32 as the cage moves is a sine wave in which each pulse or cycle corresponds to one wavelength travelled. The measurement is thus made in terms of the number of wavelengths. The wavelength can be accurately known and thus the measurement can be converted to feet or meters.

The amplitude of the signal from the probe after rectification and amplification in amplifier 50 varies between a maximum value when the resonator 28 is at a node of the standing wave pattern to a minimum value at an anti-node with a sinusoidal waveform in between. The converter 52 converts the signal amplitude into a linear waveform representative of distance. Whenever the maximum or minimum value is reached the converter is switched over so as to continue adding distance increments despite the fact that the signal is now changing in the opposite direction. For this purpose suitable logic circuitry is provided to determine the direction of change of the signal. The counter 54 thus holds a count which defines the distance travelled by the cage 36 to an accuracy of a small fraction of a wavelength, e.g. a few centimeters.

A rate comparator 60 determines the rate of change of the count in counter 54. This is a measure of the speed of the cage, and is applied to a velocity display 64, in feet or meters per second.

As the system can be electronically zeroed to any desired reference position, by presetting the count in counter 54 by means of logic circuitry 66, the accuracy of the positioning of the cable and the cavity 14 is unimportant.

The output from the analogue to digital converter 52 can also be used to control the movement of the cage, e.g. to slow it when approaching a level at which it is to stop and to stop it at the appropriate point. The signals can also be compared with signals 70 from the winding machinery to indicate rope slip.

The oscillator frequency used is related to the linear resolution required, the best transmission line stability, the most advantageous transmission line current, and other factors affecting the stability of the standing waves. It is anticipated that frequencies in the range 150 MHz to 1000 MHz may be suitable.

Figures 4A, 4B, 4C:
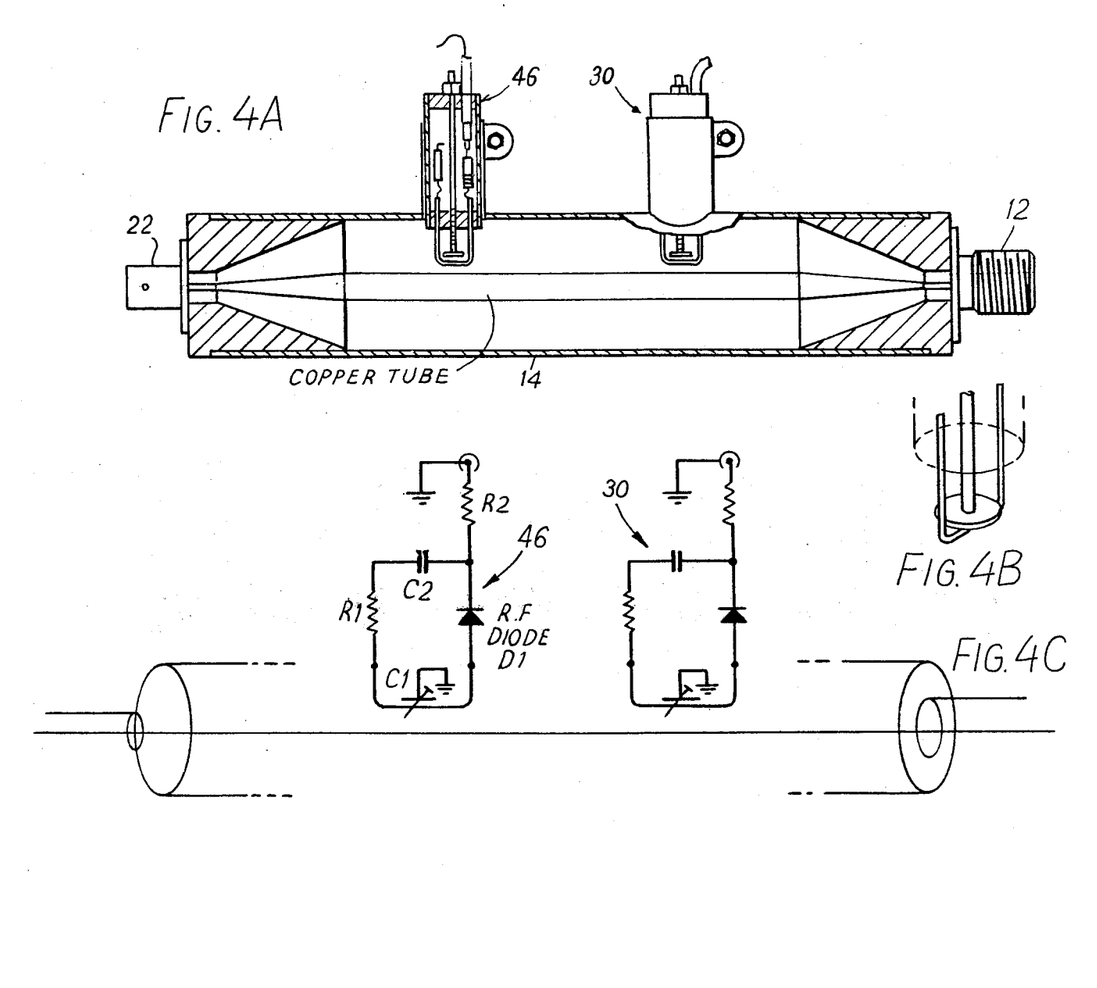
FIG. 4A is an enlarged cross-sectional view of the coaxial cavity in the position sensor of FIG. 1.
FIG. 4B is an enlarged perspective view of the tip of a probe in the coaxial cavity of FIG. 4A.
FIG. 4C is a schematic of the theoretical equivalent circuits for the probes in the coaxial cavity of FIG. 4A.

The construction of the cavity 14 is shown in more detail in FIG. 4A, and FIG. 4C illustrates the theoretical equivalent circuits for the probes 30 and 46. The probe 30 detects the reflected standing wave and the probe 46 detects the forward standing wave. Probe 30 is used to detect a change in a characteristic of the standing wave which will occur when the resonator is coincident with a standing wave anti-node.

Figure 5A:
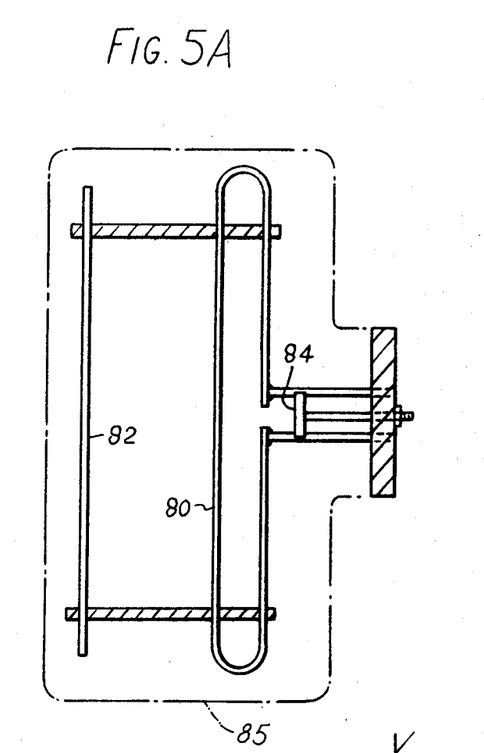
FIG. 5A is a side view of one embodiment of a resonator utilized in the position sensor of FIG. 1.
Figure 5B:
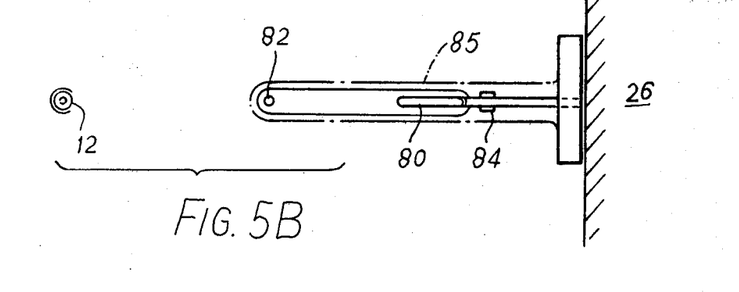
FIG. 5B is a top view of the resonator of FIG. 5A.
Figure 6A:
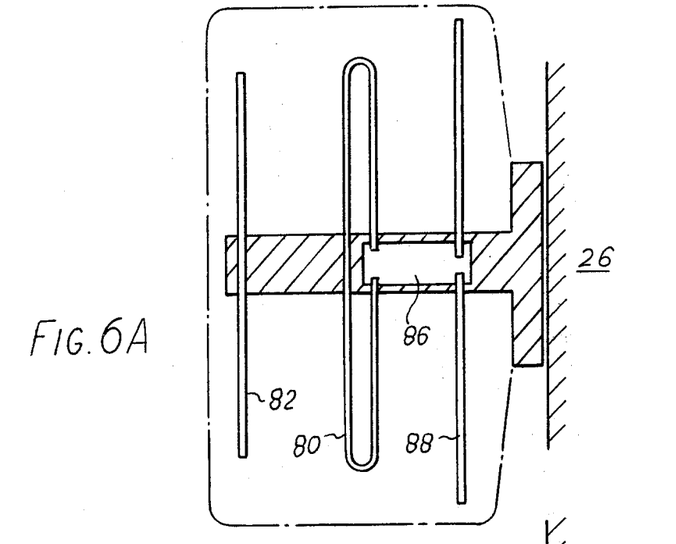
FIG. 6A is a side view of an alternative embodiment of a resonator utilized in the position sensor of FIG. 1.

Two possible forms for the resonator 28 are shown in FIGS. 5A and 6A respectively. In its simplest form it is a half-wave dipole. The resonator of FIGS. 5A and 5B includes a folded dipole 80 and a director element 82. The dipole is tuned by an impedance 84. The resonator of FIG. 5A relies on parasitic resonance by absorption and reflection. The unit is preferably enclosed in a plastic cover 85 which can be bolted onto the cage 26 without modification of the cage.

Figure 6B:
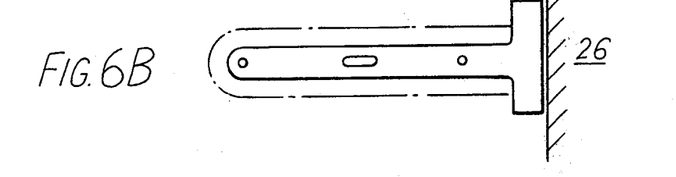
FIG. 6B is a top view of the resonator of FIG. 6B.
Figure 6C:
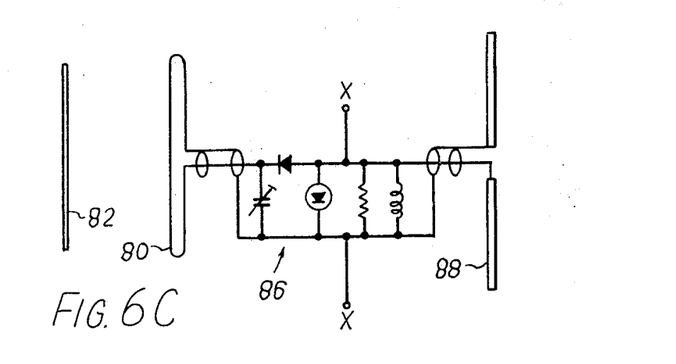
FIG. 6C is a schematic of a circuit connected to the resonator of FIG. 6A.

A multi-element resonator is shown in FIGS. 6A and 6B which includes more complex circuitry 86 connected to the dipole 80 and to an exciter element 88. In the circuit 86, illustrated in FIG. 6C, and R.F. diode is used as a detector stage and a varactor diode is used as an oscillatory element to feed the exciter element. The resonator can be turned into an active resonator by the addition of a low-power source such as battery across the terminals X—X, if this is found to be necessary.

To overcome possible effects of interference by other metallic objects particularly to the cage environment, a narrow band frequency modulated signal (N.B.F.M.) may be used. In this way the variations in frequency reduces the chance of resonance in direct ratio to the frequency bandwidth. A system of frequency pulse modulation might be used either in the indirect or direct phase mode. The resonator is in fact an aerial driven into resonance by the standing wave current. A separate N.B.F.M. signal might be used for each cage to identify with its particular resonator.

The stage after detection at the cavity probe will then include a discriminator circuit. It will be appreciated that with variations in frequency associated with this form of modulation, the standing wave nodes will be constantly changing, and this will be further complicated by the fact that more than one FM signal may be transmitted on the feeder cable if a multiple cage system is used. This means that the transmitted signal, one for each cage, must be accurately strobed, and the strobed sync pulse will be fed by suitable circuitry into the logic circuitry after the analogue to digital converter. In this way, a sample of part of the standing wave complex signal that is typical of a particular cage signal can be logically processed and read out on the digit display peculiar to that cage. Another method of approaching this problem would be to use a microprocessor with a dedicated firmware programme to perform a fast Fourier transform in real time and multiplexed directly to the logic circuitry.

If the multiplexed signalling for monitoring more than one cage with a single cable are envisaged, the oscillator output would be modulated and variations in output current will occur. In this case the oscillator 40 would be controlled by a feedback loop from the probe 46 to maintain the desired signal amplitude.

The system illustrated has a number of advantages. It is electronic and has no moving parts which are liable to wear. The output signals are readily derived in digital form and can easily be interfaced with digital control circuitry. Also, high resolution can be obtained irrespective of cable length, so long as the standing wave can be set up.

I claim:

1. A position or movement sensor responsive to relative movement of an object along a path, comprising:
   an elongate radiating conductor along the path;
   means coupled to one end of said conductor for forming an electromagnetic standing wave in the conductor;
   a resonator carried by the object; and
   detector means coupled to the said one end of the conductor for detecting cyclical changes in the standing wave characteristics as the resonator moves through the radiated standing wave pattern.

2. A sensor according to claim 1 in which the conductor comprises a leaky coaxial cable.

3. A sensor as claimed in claim 1 in which the resonator is a dipole aerial.

4. A sensor as claimed in claim 1 in which the detector means is responsive to changes in current or voltage.

5. A sensor as claimed in claim 1 in which the standing-wave forming means comprises an R.F. source, said source generating a narrow band frequency-modulated signal.

6. In a sensor responsive to movement of a mine cage in a mine shaft;
   a leaky coaxial cable longitudinally fixed in the mine shaft along the path of the cage;
   means fixed at one end of said leaky coaxial cable for forming an electromagnetic standing wave therein;
   a resonator carried by and movable with said mine cage close to said leaky coaxial cable; and
   detector means also fixed at said one end of said cable for detecting cyclical changes in the standing wave characteristics as the resonator moves through the radiated standing wave pattern.

7. A sensor as claimed in claim 6 in which said means for forming said standing wave include an R.F. signal source tuned to set up said standing wave in said cable;
   said cable having a continuous longitudinal slot open toward the adjacent cage path and providing a polar radiation characteristic with a fixed major lobe;
   said resonator on said cage facing said lobe and lying parallel to said cable, said resonator being a passive resonator turned to the frequency of said signal source for causing a change in the characteristics of the standing wave when located adjacent a node of said standing wave;
   said detector means including means for counting the number of standing wave nodes passed by the cage in moving along said mine shaft.

8. A sensor according to claim 7 including a coaxial cavity at one end of said leaky coaxial cable and a terminating impedance at the other end of said cable, said standing wave forming means including an coaxial feeder feeding said cavity from said signal source, said detector means including a probe incorporated in said cavity and driving said counting means.

* * * * *

UNITED STATES PATENT OFFICE
CERTIFICATE OF CORRECTION

Patent No. 4,342,021        Dated July 27, 1982

Inventor(s) Ronald W. Schaller

It is certified that error appears in the above-identified patent and that said Letters Patent are hereby corrected as shown below:

Column 6, line 20; change "turned" to ---tuned---.

Signed and Sealed this

Twenty-fifth Day of January 1983

[SEAL]

Attest:

GERALD J. MOSSINGHOFF

Attesting Officer            Commissioner of Patents and Trademarks